Aug. 20, 1935.  H. BEIERSDORF  2,012,093
DOOR TENSION DEVICE FOR MOTOR VEHICLES
Filed Aug. 6, 1934  2 Sheets-Sheet 1

Inventor
Hans Beiersdorf
By Robb & Robb
Attorneys

Aug. 20, 1935.  H. BEIERSDORF  2,012,093
DOOR TENSION DEVICE FOR MOTOR VEHICLES
Filed Aug. 6, 1934  2 Sheets-Sheet 2

Inventor
Hans Beiersdorf
By Robb & Robb
attorneys

Patented Aug. 20, 1935

2,012,093

UNITED STATES PATENT OFFICE 2,012,093

DOOR TENSION DEVICE FOR MOTOR VEHICLES

Hans Beiersdorf, Berlin-Dahlem, Germany

Application August 6, 1934, Serial No. 738,733
In Germany September 9, 1933

11 Claims. (Cl. 292—1)

My invention relates to motor vehicles, and more particularly to a door tension device therefor for preventing the objectionable rattling of automobile doors.

The object of my invention is to provide a device of the above-indicated character having means which permit not only of retaining but also of holding the door under tension, whereby the rattling of the same is counteracted in a most effective manner.

A practical embodiment of my invention is represented in the accompanying drawings forming part of this specification, in which similar numerals of reference indicate corresponding parts in both views, and in which Fig. 1 is a fragmentary view of an automobile body equipped with the door tension device made in accordance with my invention;

Figure 1:
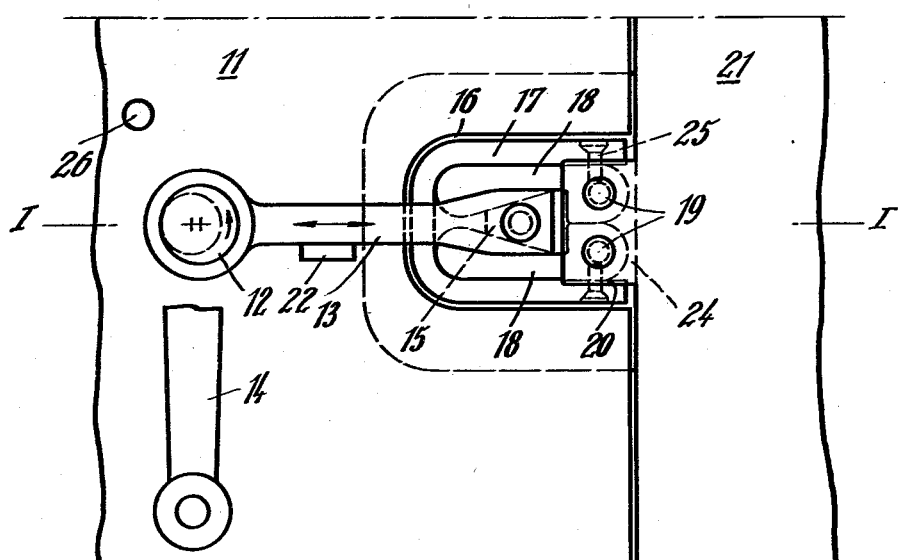
Fig. 1a is a similar view showing the device in operative position.
Figure 2:
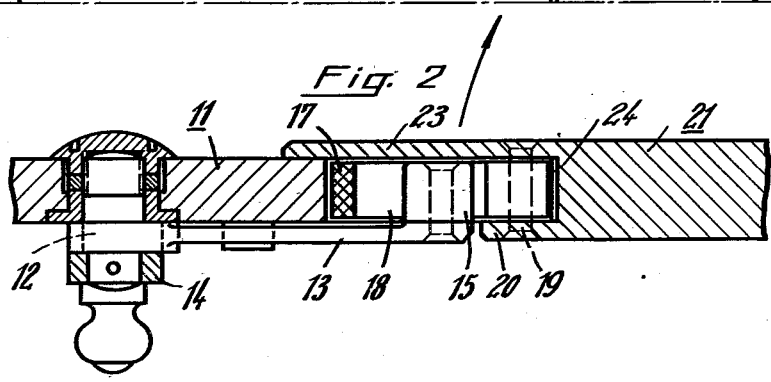
Fig. 2 is a horizontal sectional view taken on the line I—I of Fig. 1.
Figure 1A:
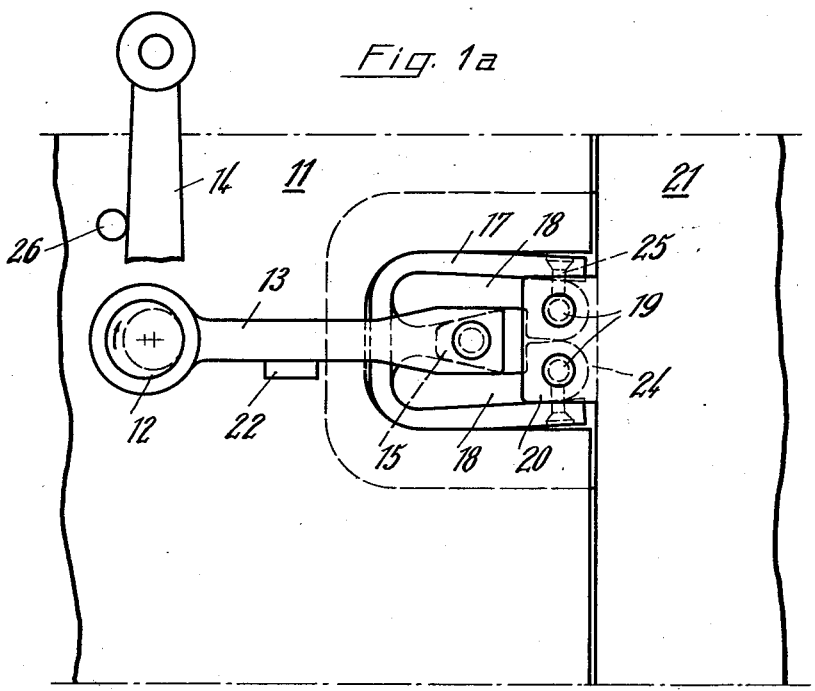

Referring to Fig. 1, 11 denotes the wall partly broken off of an automobile body viewed from the inside and 21 the door. A crank 14 with an eccentric 12 is rotatably mounted on the wall 11, by means of which crank an eccentric rod 13 resting on a support 22 may be reciprocated. In the wall of the automobile body at the abutting end thereof there is a recess 16 having a form as shown in the drawings for the reception of the tension device parts hereinafter described. A wedge-like lug 15 is rotatably mounted on the other end of the eccentric rod 13 extending into the recess 16. The edges of the inclined surfaces of the lug 15 are well rounded off so as to permit a slipping over of two metallic jaws 18. The door 21 is mounted in the usual manner on hinges. At the other abutting end of the door 21 there is an outer extension 23 overlapping for some distance the automobile body and closing the recess 16 from the outside. In the recess 24 arranged in the door 21 two metallic jaws 18 are rotatably mounted on pins 19, the inner opposite surfaces of the jaws being inclined so as to conform to the inclination of the lug 15. The metallic jaws 18 are held together by the aid of a strap 17 of resilient material, such as rubber, leather or the like, secured to the same by means of flat head screws 25 and are held in the position shown with respect to the door 21 by means of an extension 20.

On closing the door the metallic jaws 18 slip over the lug 15 rotatably mounted on the eccentric rod 13, the rubber strap being so arranged as to loosely fit into the recess 16. As soon as the door 21 is latched, the crank 14 or any other suitable handle is rotated to the stop 26, thus causing the lug 15 to move to the left a distance equal to the stroke of the eccentric 12. The handle 14 is preferably rotated from the position shown a few degrees beyond 180° so as to prevent a springing back of the handle 14 and, consequently, a loosening of the parts held under tension. Upon the rotation of the handle 14, the metallic jaws 18 spread and press the rubber strap against the walls of the recess 16. By forcing the jaws apart the weight of the door is elastically taken up by the wall of the automobile body. Furthermore, an elastic tension coupling is brought about as a result of the tension exerted on the lug 15 through the hinges of the door 21, thus preventing also at the side where the hinges are applied to the door a rattling of the latter in a most effective manner.

The tension device according to my invention is especially valuable for cabriolets, in which particularly in the upper part of the door frame of the body when the hood is raised there are no connections or joints so that the door is liable to easily rattle.

My invention may be embodied in other forms than those shown and described and I, therefore, intend to cover by the appended claims all changes and modifications apparent to those skilled in the art and within the scope of my invention.

I claim as my invention:

1. The combination with a vehicle body and door therefor, of a tensioning device comprising a pressure producing member mounted on one of said parts, and actuating means carried by the other of said parts and operable to co-act with the pressure producing member aforesaid when the door is closed to exert pressure against the part carrying said actuating means.

2. The combination with a vehicle body and door therefor, of a tensioning device comprising a pressure producing member mounted on one of said parts, actuating means carried by the other of said parts and operable to co-act with the pressure producing member aforesaid when the door is closed to exert pressure against the part carrying said actuating means, and resilient means through which the said pressure is exerted on the pressure receiving part to thereby afford a cushioning effect.

3. The combination with a vehicle body and door therefor, of a tensioning device comprising spaced jaw members carried by one of said parts, the other of said parts having a pressure receiving wall on which the jaw members are adapted to exert pressure when the door is closed and means adjacent the wall aforesaid adapted to move into the jaws and operable to expand the jaws to exert said pressure on the wall when the door is closed.

4. The combination with a vehicle body and door therefor, of a tensioning device comprising spaced jaw members carried by one of said parts, the other of said parts having a pressure receiving wall on which the jaw members are adapted to exert pressure when the door is closed, means adjacent the wall aforesaid adapted to move into the jaws and operable to expand the jaws to exert said pressure on the wall when the door is closed, and cushioning means so positioned as to resiliently transmit the pressure of the jaws to the wall.

5. The combination with a vehicle body having a recess therein and a door therefor, of door tensioning means comprising a pair of jaws mounted on the door in spaced relation and arranged to move into the recess of the body when the door is closed, and actuating means on the body adapted to be received between the jaws in the closed position aforesaid and operable to expand the jaws for producing pressure on the walls of the recess.

6. The combination with a vehicle body having a recess therein and a door therefor, of door tensioning means comprising a pair of jaws mounted on the door in spaced relation and arranged to move into the recess of the body when the door is closed, yieldable means engaging about the jaws and normally tending to hold them in contracted position, and actuating means on the body adapted to be received between the jaws in the closed position aforesaid and operable to expand said jaws for producing pressure on the walls of the recess.

7. The combination with a vehicle body having a recess therein and a door therefor, of door tensioning means comprising a pair of jaws mounted on the door in spaced relation and arranged to move into the recess of the body when the door is closed, yieldable means engaging about the jaws and normally tending to hold them in contracted position, and actuating means on said body adapted to be received between the jaws in the closed position aforesaid and operable to expand the jaws for producing pressure on the wall of the recess, said yieldable means being arranged to lie between the jaws and the recess walls so as to resiliently transmit the pressure of the jaws to said walls.

8. The combination with a vehicle body having a recess therein and a door therefor, of door tensioning means comprising a pair of jaws mounted on the door in spaced relation and arranged to move into the recess of the body when the door is closed, actuating means on the body adapted to project between the jaws when the door is in closed position, and means to shift said actuating means relative to the jaws whereby to expand the same and simultaneously produce a tension on the door supports in a direction transversely of said door.

9. The combination with an automobile body having a recess therein, two metallic jaws oscillatably mounted in the wall of said door, a resilient member secured to said jaws and means associated with the wall of said body for causing said jaws to press said resilient member against the walls of said recess so as to retain and to simultaneously hold said door under tension.

10. The combination with the automobile body having a recess therein, of two metallic jaws oscillatably mounted in the wall of said door, a resilient member secured to said jaws and means associated with the wall of said body and comprising an eccentric, an eccentric rod having a lug rotatably mounted at one end thereof and a handle connected to said eccentric, said lug and jaws being effective to press said resilient member against the walls of said recess so as to retain said door under tension when said handle is rotated beyond a predetermined angle.

11. The combination with an automobile body having a recess therein, of two metallic jaws oscillatably mounted in the wall of said door, a resilient member secured to said jaws, and means associated with the wall of said body for causing said jaws to press said resilient member against the walls of said recess so as to retain and to simultaneously hold said door under tension, said door having a tongue-like outer extension overlapping a portion of the wall of said body and an inner extension to hold said jaws in operative position..

HANS BEIERSDORF.